US009109686B2

(12) United States Patent
Jinno et al.

(10) Patent No.: US 9,109,686 B2
(45) Date of Patent: Aug. 18, 2015

(54) HYDRAULIC CONTROL DEVICE

(71) Applicant: AISIN AW CO., LTD., Anjo-shi, Aichi-ken (JP)

(72) Inventors: Tomoya Jinno, Nishio (JP); Tomomi Ishikawa, Anjo (JP); Masamichi Yamaguchi, Anjo (JP); Tetsuya Shimizu, Anjo (JP); Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 45 days.

(21) Appl. No.: 14/343,340

(22) PCT Filed: Dec. 6, 2012

(86) PCT No.: PCT/JP2012/081653
§ 371 (c)(1),
(2) Date: Mar. 6, 2014

(87) PCT Pub. No.: WO2013/084993
PCT Pub. Date: Jun. 13, 2013

(65) Prior Publication Data
US 2014/0231205 A1 Aug. 21, 2014

(30) Foreign Application Priority Data
Dec. 8, 2011 (JP) .................................. 2011-269239

(51) Int. Cl.
F16H 45/02 (2006.01)
F16H 61/14 (2006.01)
(52) U.S. Cl.
CPC ................ *F16H 45/02* (2013.01); *F16H 61/14* (2013.01)

(58) Field of Classification Search
USPC .......................................... 192/3.3, 3.29, 3.28
See application file for complete search history.

(56) References Cited

U.S. PATENT DOCUMENTS 6,662,918 B2 * 12/2003 Takeuchi et al. ............. 192/3.29
(Continued)

FOREIGN PATENT DOCUMENTS

JP 03-204472 9/1991
JP 2003-042287 2/2003
(Continued)

OTHER PUBLICATIONS

Jan. 29, 2013 International Search Report issued in International Application No. PCT/JP2012/081653 (with translation)/.

*Primary Examiner* — Ramya Burgess
*Assistant Examiner* — David J Hlavka
(74) *Attorney, Agent, or Firm* — Oliff PLC

(57) ABSTRACT

A hydraulic control device includes a lock-up control valve that regulates a line pressure to generate a control pressure, and a lock-up relay valve that switches between paths through which a hydraulic pressure is supplied to and discharged from a torque converter. The lock-up relay valve is formed to be capable of switching between a path that connects between a control pressure oil passage to which the control pressure is output and a lock-up oil passage communicated with a lock-up oil chamber and that connects between a control pressure oil passage to which the control pressure is output and a circulation input oil passage communicated with a converter oil chamber, and a path that blocks connection between the control pressure oil passage and the lock-up oil passage and that blocks connection between the control pressure oil passage and the circulation input oil passage.

3 Claims, 5 Drawing Sheets

(56) References Cited

U.S. PATENT DOCUMENTS

| | | | |
|---|---|---|---|
| 7,582,042 B2 * | 9/2009 | Sato et al. | 477/158 |
| 8,066,618 B2 * | 11/2011 | Noda et al. | 477/168 |
| 2006/0032720 A1 | 2/2006 | Ando et al. | |
| 2011/0011075 A1 | 1/2011 | Sakamoto | |

FOREIGN PATENT DOCUMENTS

| | | |
|---|---|---|
| JP | 2006-052746 | 2/2006 |
| JP | 2009-052643 | 3/2009 |
| JP | 2010-065837 | 3/2010 |
| JP | 2011-021695 | 2/2011 |

* cited by examiner

FIG. 2

|   |   | C-1 | C-2 | C-3 | B-1 | B-2 | F-1 | SL1 | SL2 | SL3 | SL5 | S1 | S2 |
|---|---|-----|-----|-----|-----|-----|-----|-----|-----|-----|-----|----|----|
|   | P |     |     |     |     |     |     |     |     |     |     |    |    |
|   | REV |   |     | O   |     | O   |     |     |     |     |     |    |    |
|   | N |     |     |     |     |     |     |     |     |     |     |    |    |
| D | 1st | O |     |     |     | (O) | O   | O   |     | (O) |     | (O) |   |
|   | 2nd | O |     |     | O   |     |     | O   |     |     | O   |    |    |
|   | 3rd | O |     | O   |     |     |     | O   |     | O   |     |    |    |
|   | 4th | O | O   |     |     |     |     | O   | O   |     |     |    |    |
|   | 5th |   | O   | O   |     |     |     |     | O   | O   |     |    |    |
|   | 6th |   | O   |     | O   |     |     | O   |     | O   |     |    |    |

(O): ENGAGED WITH ENGINE BRAKE IN OPERATION

HYDRAULIC CONTROL DEVICE

TECHNICAL FIELD

The present invention relates to a hydraulic control device that controls a hydraulic pressure for a torque converter with a lock-up clutch.

BACKGROUND ART

Hitherto, there has been proposed a hydraulic control device of this type that controls a hydraulic pressure for a torque converter with a lock-up clutch having a fluid transmission chamber (circulation oil chamber) connected to a torque converter input-side oil passage and a torque converter output-side oil passage, and a lock-up clutch hydraulic pressure chamber (engagement oil chamber) to which a lock-up clutch oil passage is connected (see Patent Document 1, for example). The device includes a lock-up relay valve having a switching portion that switches between a state in which a secondary pressure is supplied to the torque converter input-side oil passage directly and a state in which the secondary pressure is supplied to the torque converter input-side oil passage via an orifice, and a switching portion that switches between a state in which a control pressure obtained by regulating the secondary pressure by a lock-up clutch control valve is supplied to the lock-up clutch oil passage and a state in which supply of the control pressure to the lock-up clutch oil passage is blocked. This allows the hydraulic pressure in the fluid transmission chamber to be switched between high and low levels, and allows the lock-up clutch to be engaged by supplying the control pressure from the lock-up clutch control valve to the lock-up clutch hydraulic pressure chamber with the hydraulic pressure in the fluid transmission chamber at the low level.

With a hydraulic control device of a type in which a pump is actuated using power from a motor, meanwhile, in engaging a lock-up clutch with a motor rotating at a low rotational speed, a sufficient hydraulic pressure for engaging the lock-up clutch may not be obtained from a secondary pressure. Thus, there is proposed a technology for engaging a lock-up clutch using a hydraulic pressure in a line pressure system (see Patent Document 2).

RELATED-ART DOCUMENTS

Patent Documents

Patent Document 1: Japanese Patent Application Publication No. 2011-21695 (JP 2011-21695 A)
Patent Document 2: Japanese Patent Application Publication No. 2010-65837 (JP 2010-65837 A)

SUMMARY OF THE INVENTION

With the hydraulic control device, in order to improve the controllability of the lock-up clutch, it is necessary to stabilize a pressure difference between a hydraulic pressure in the circulation oil chamber and a hydraulic pressure in the engagement oil chamber, and this must be considered well in designing the device. Here, in the technology according to Patent Document 2 described above, the lock-up clutch is engaged by a pressure difference between a hydraulic pressure within a lock-up oil chamber and a hydraulic pressure (circulation pressure) within a coupling chamber (circulation oil chamber), and the hydraulic pressure within the lock-up chamber is controlled by a linear solenoid, and the hydraulic pressure within the coupling chamber is separately controlled by a pressure reducing valve. In this case, different valves are required to control the respective hydraulic pressures, which increases the number of components. In the technology according to Patent Document 2, the line pressure is circulated to the coupling chamber (circulation oil chamber) via the pressure reducing valve also when the lock-up clutch is to be disengaged, which may increase the flow rate of hydraulic oil at the line pressure to be consumed and significantly reduce the line pressure. In this case, a pump must be increased in size in order to secure a sufficient line pressure.

It is a main object of the hydraulic control device according to the present invention to improve the controllability of a lock-up clutch by stabilizing a pressure difference between a hydraulic pressure in a circulation oil chamber of a torque converter and a hydraulic pressure in an engagement oil chamber.

In order to achieve the foregoing main object, the hydraulic control device according to the present invention adopts the following means.

The present invention provides
a hydraulic control device that controls a hydraulic pressure for a torque converter with a lock-up clutch having a circulation oil chamber for circulation of hydraulic oil within a converter body and an engagement oil chamber for engagement of the lock-up clutch using a pressure difference between a supplied hydraulic pressure and the hydraulic pressure within the circulation oil chamber, characterized by including:
a circulation input oil passage connected to a circulation input port through which a circulation pressure is input to the circulation oil chamber;
a circulation output oil passage connected to a circulation output port through which the circulation pressure is output from the circulation oil chamber;
an engagement oil passage connected to an engagement port through which an engagement pressure is input to and output from the engagement oil chamber;
a pressure regulation valve that receives and regulates a source pressure to output the regulated pressure;
a first output oil passage connected to an output port of the pressure regulation valve;
a second output oil passage connected to the output port of the pressure regulation valve;
a switcher that switches between a first state in which connection between the engagement oil passage and the first output oil passage is allowed and connection between the circulation input oil passage and the second output oil passage is allowed, and a second state in which connection between the engagement oil passage and the first output oil passage is blocked and connection between the circulation input oil passage and the second output oil passage is blocked;
an orifice formed in the second output oil passage;
a pump that generates a hydraulic pressure using power of a motor;
a hydraulic pressure generator that generates a line pressure that is high and a secondary pressure that is lower than the line pressure on the basis of the hydraulic pressure generated by the pump;
a line pressure oil passage supplied with the line pressure; and
a secondary pressure oil passage supplied with the secondary pressure, wherein:
an input port of the pressure regulation valve is connected to the line pressure oil passage; and the switcher further blocks connection between the secondary pressure oil passage and the circulation input oil passage in the first state, and further allows connection between the secondary pressure oil passage and the circulation input oil passage in the second state.

The hydraulic control device according to the present invention includes the switcher which switches between the first state in which connection between the engagement oil passage communicated with the engagement oil chamber and the first output oil passage connected to the output port of the pressure regulation valve is allowed and connection between the circulation input oil passage communicated with the circulation oil chamber and the second output oil passage connected to the output port of the pressure regulation valve is allowed, and the second state in which connection between the engagement oil passage and the first output oil passage is blocked and connection between the circulation input oil passage and the second output oil passage is blocked, and the orifice is formed in the second output oil passage. This allows the output of the pressure regulation valve to be supplied to the engagement oil passage directly, and allows the output of the pressure regulation valve to be supplied to the circulation input oil passage via the orifice, which makes it possible to engage the lock-up clutch by controlling a pressure difference between the hydraulic pressure in the engagement oil chamber and the hydraulic pressure in the circulation oil chamber using the same output from the pressure regulation valve. As a result, it is possible to stabilize the pressure difference, which improves the controllability of the lock-up clutch. In addition, the circulation output oil passage is connected to the circulation output port side of the circulation oil chamber, and the output port of the pressure regulation valve is connected to the circulation input port side of the circulation oil chamber via the circulation input oil passage, the switcher, the second output oil passage, and the orifice. Thus, the hydraulic pressure in the circulation oil chamber can be drained from the circulation output oil passage side, and can be drained from the circulation input oil passage side as well along with pressure regulation performed by the pressure regulation valve. As a result, it is possible to immediately reduce the hydraulic pressure in the circulation oil chamber, which further improves the controllability of the lock-up clutch. In addition, the hydraulic control device includes the pump which generates a hydraulic pressure using power of the motor, the hydraulic pressure generator which generates the line pressure which is high and the secondary pressure which is lower than the line pressure on the basis of the hydraulic pressure generated by the pump, the line pressure oil passage supplied with the line pressure, and the secondary pressure oil passage supplied with the secondary pressure, the input port of the pressure regulation valve is connected to the line pressure oil passage, and the switcher further blocks connection between the secondary pressure oil passage and the circulation input oil passage in the first state, and further allows connection between the secondary pressure oil passage and the circulation input oil passage in the second state. This allows the line pressure which is higher to be supplied to the engagement oil chamber, which allows the lock-up clutch to be engaged even if the rotational speed of the motor is relatively low. In addition, the secondary pressure can be supplied to the circulation oil chamber as the circulation pressure when the lock-up clutch is to be disengaged, which prevents a reduction in line pressure. Here, the term "orifice" means pressure reducing means for reducing a hydraulic pressure within the second output oil passage (pressure suppressing means for suppressing the pressure of hydraulic oil within the second output oil passage).

The hydraulic control device according to the present invention may further include: a bypass oil passage connected to the first output oil passage so as to bypass the orifice; and a one-way valve that is attached to the bypass oil passage and that opens only in such a direction that the circulation pressure is discharged from the circulation input port. This configuration makes it possible to improve the performance of drainage of the hydraulic pressure in the circulation oil chamber from the circulation input oil passage side.

The hydraulic control device according to the present invention may further include a relief oil passage provided with a relief valve that opens when a hydraulic pressure that is equal to or more than a set pressure is applied, and the switcher may further block connection between the engagement oil passage and the relief oil passage in the first state, and further allow connection between the engagement oil passage and the relief oil passage and connection between the circulation output oil passage and the relief oil passage in the second state. This configuration allows the engagement oil chamber to be filled with hydraulic oil also when the lock-up clutch is disengaged, which allows the lock-up clutch to be immediately engaged next time.

BRIEF DESCRIPTION OF THE DRAWINGS

FIG. 2 is an operation table of a speed change mechanism 80.

MODES FOR CARRYING OUT THE INVENTION

A best mode of implementing the present invention will be described below with reference to an embodiment.

Figure 1:
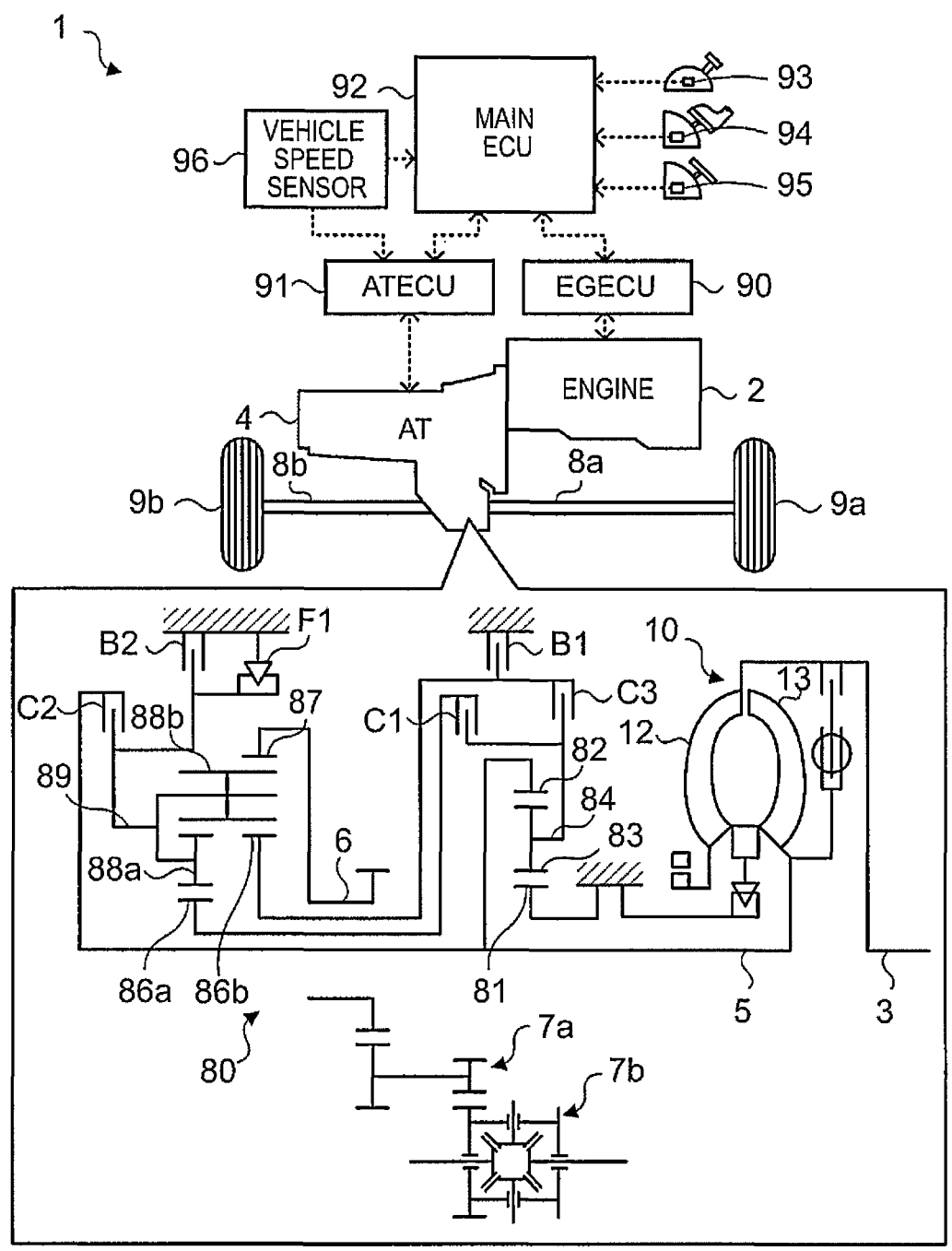
FIG. 1 is a diagram illustrating a schematic configuration of an automobile 1.
Figure 3:
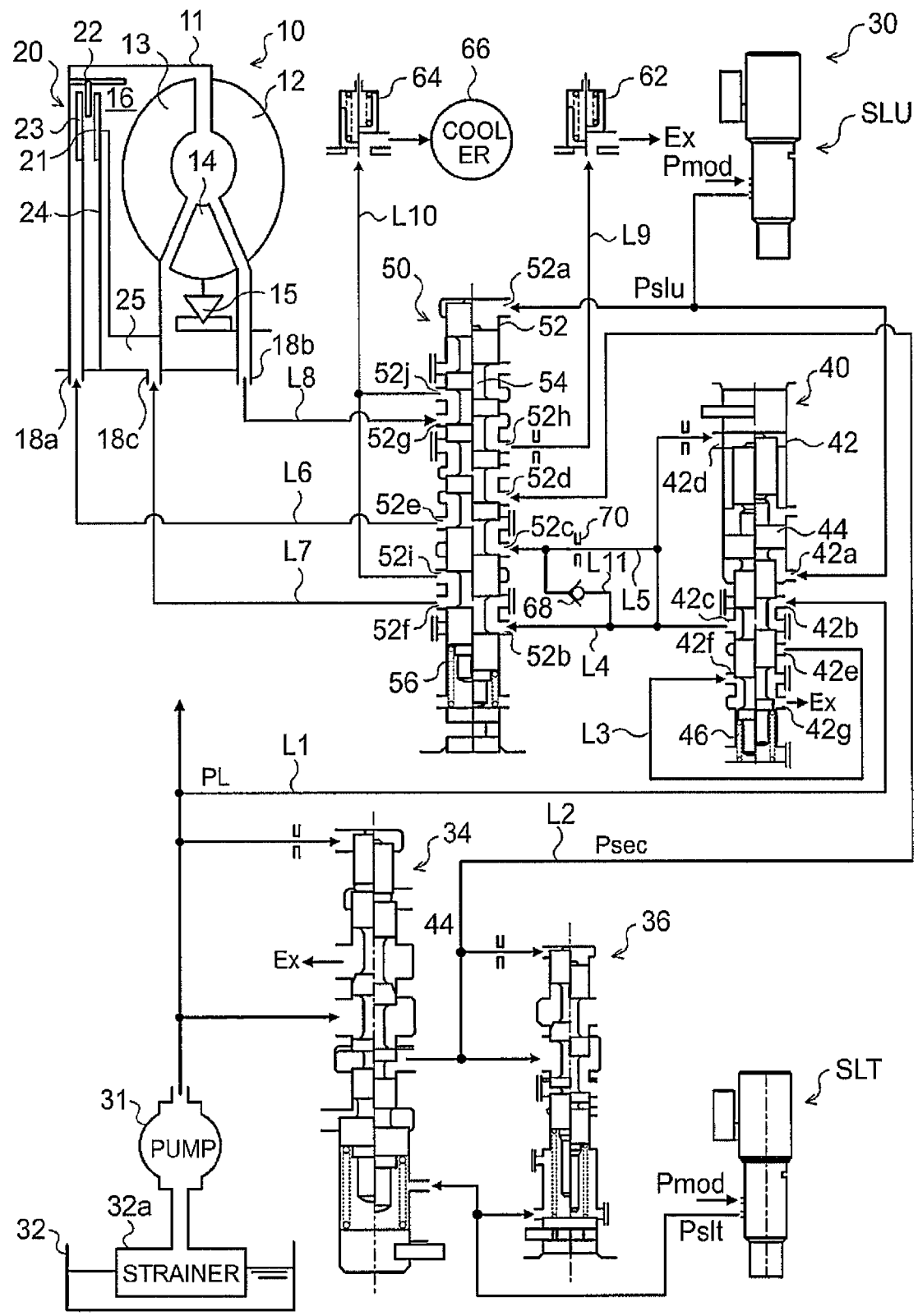
FIG. 3 is a diagram illustrating a schematic configuration of a hydraulic control device 30 according to an embodiment of the present invention.
Figure 4:
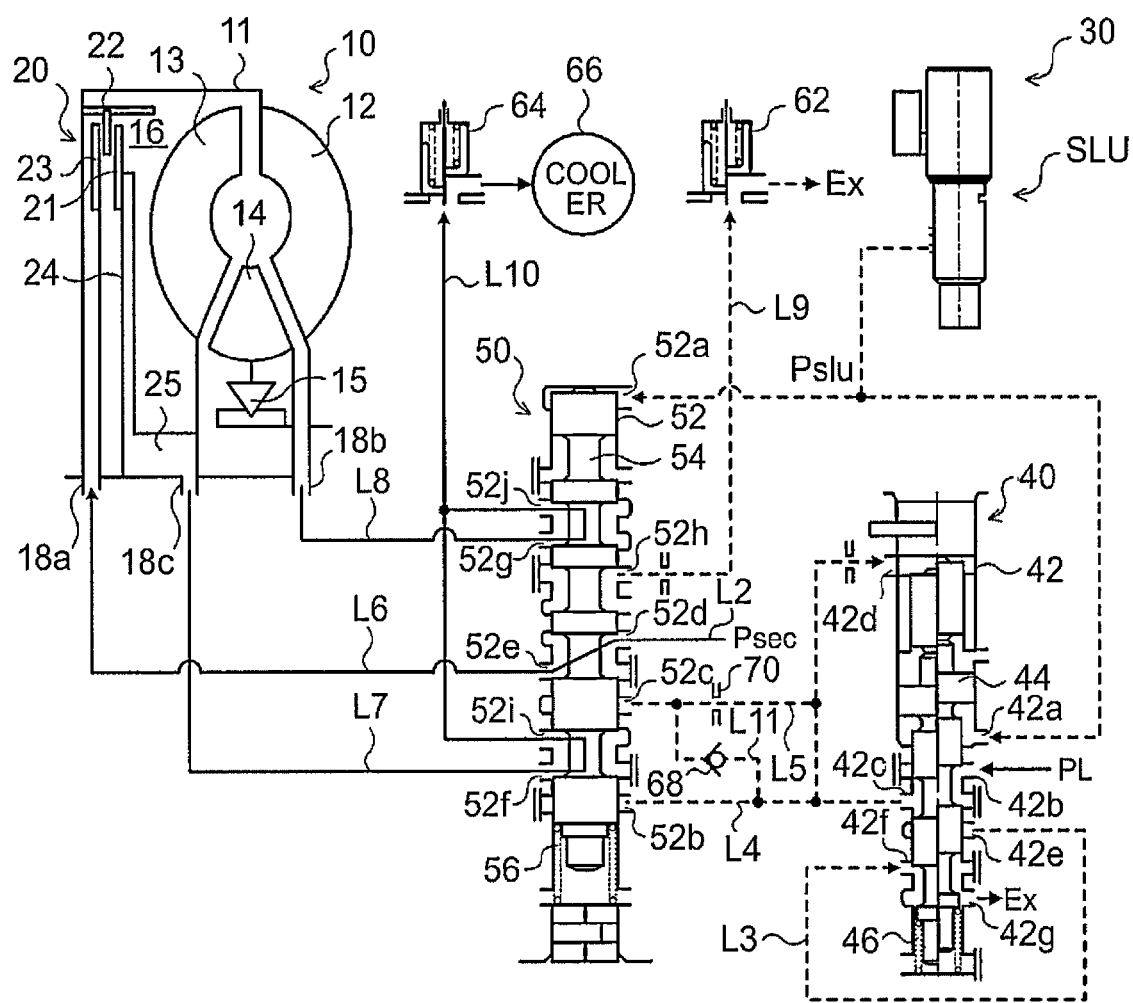
FIG. 4 illustrates operation of the hydraulic control device 30 according to the embodiment in disengaging a lock-up clutch 20.
Figure 5:
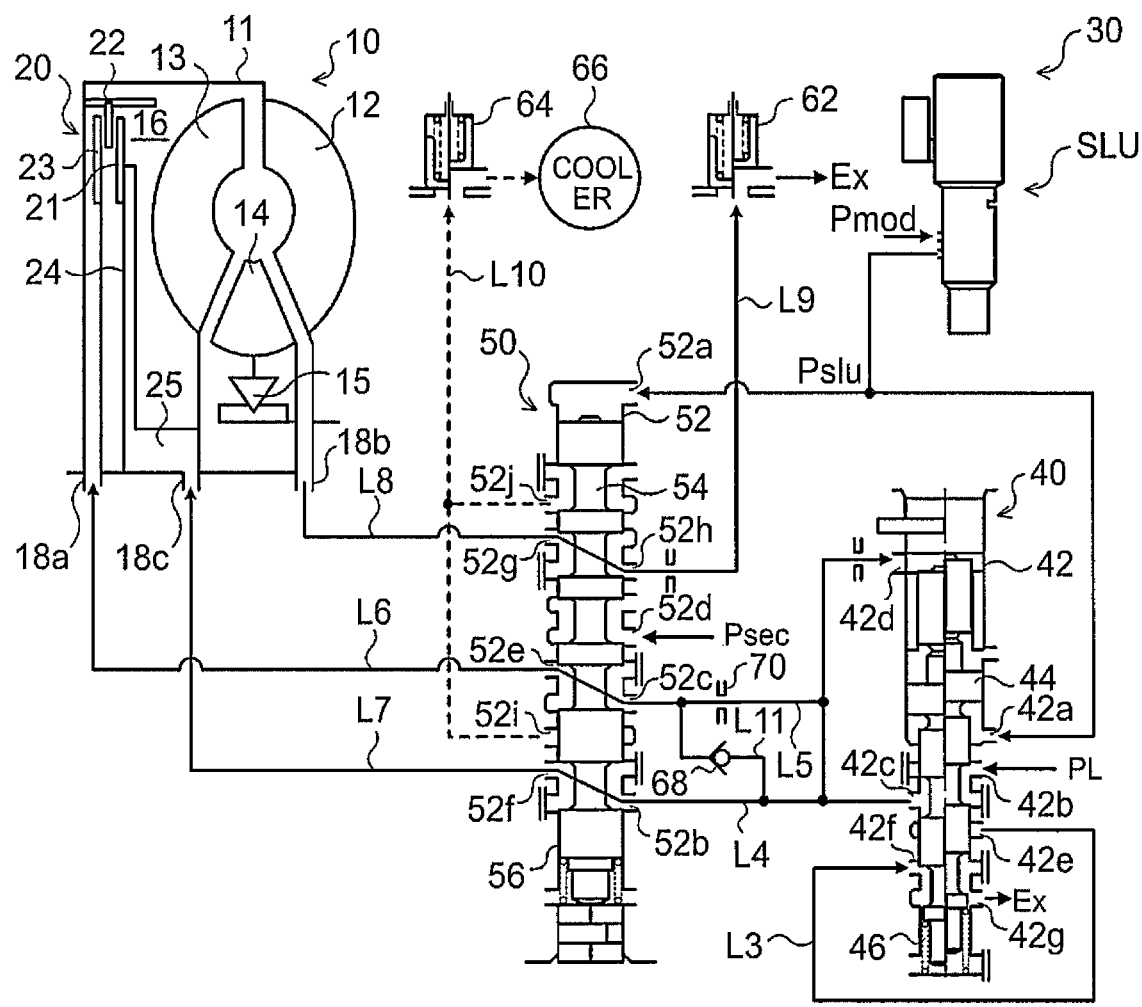
FIG. 5 illustrates operation of the hydraulic control device 30 according to the embodiment in engaging the lock-up clutch 20.

FIG. 1 is a diagram illustrating a schematic configuration of an automobile 1. FIG. 2 is an operation table of a speed change mechanism 80. FIG. 3 is a diagram illustrating a schematic configuration of a hydraulic control device 30 according to the embodiment of the present invention. FIG. 4 illustrates operation of the hydraulic control device 30 according to the embodiment in disengaging a lock-up clutch 20. FIG. 5 illustrates operation of the hydraulic control device 30 according to the embodiment in engaging the lock-up clutch 20.

As illustrated in FIG. 1, the automobile 1 includes: an engine 2 which is an internal combustion engine that outputs power generated by explosive combustion of a hydrocarbon fuel such as gasoline and light oil; an engine electronic control unit (engine ECU) 90 that controls operation of the engine 2; an automatic transmission 4 that incorporates the speed change mechanism 80 connected to a crankshaft 3 of the engine 2 and connected to axles 8a and 8b for left and right wheels 9a and 9b, respectively, to transfer power from the engine 2 to the axles 8a and 8b; an automatic transmission electronic control unit (ATECU) 91 that controls the automatic transmission 4; and a main electronic control unit (main ECU) 92 that controls the entire vehicle. A shift position SP from a shift position sensor 93 that detects the operating position of a shift lever, an accelerator operation amount Ace from an accelerator pedal position sensor 94 that detects the depression amount of an accelerator pedal, a brake switch signal BSW from a brake switch 95 that detects depression of a brake pedal, a vehicle speed V from a vehicle speed sensor 96, and so forth are input to the main ECU 92 via an input port. The main ECU 92 is connected to the engine ECU 90 and the ATECU 91 via a communication port to exchange various control signals and data with the engine ECU 90 and the ATECU 91.

As illustrated in FIG. 1, the automatic transmission 4 includes: a torque converter 10 with a lock-up clutch composed of an input-side pump impeller 12 connected to the crankshaft 3 of the engine 2 and an output-side turbine runner 13; the stepped speed change mechanism 80 which has an input shaft 5 connected to the turbine runner 13 of the torque converter 10 and an output shaft 6 connected to the axles 8a and 8b via a gear mechanism 7a and a differential gear 7b and which outputs to the output shaft 6 power input to the input shaft 5 with the speed of the power changed; and the hydraulic control device 30 (see FIG. 3) which is an embodiment of the present invention which controls hydraulic drive of the torque converter 10 and the speed change mechanism 80.

The speed change mechanism 80 is structured as a 6-speed stepped speed change mechanism, and includes a single-pinion type planetary gear mechanism, a Ravigneaux type planetary gear mechanism, three clutches C1, C2, and C3, two brakes B1 and B2, and a one-way clutch F1. The single-pinion type planetary gear mechanism includes a sun gear 81 which is an external gear, a ring gear 82 which is an internal gear disposed concentrically with the sun gear 81, a plurality of pinion gears 83 meshed with the sun gear 81 and meshed with the ring gear 82, and a carrier 84 that rotatably and revolvably holds the plurality of pinion gears 83. The sun gear 81 is held stationary with respect to a case. The ring gear 82 is connected to the input shaft 5. The Ravigncaux type planetary gear mechanism includes two sun gears 86a and and 86b which are each an external gear, a ring gear 87 which is an internal gear, a plurality of short pinion gears 88a meshed with the sun gear 86a, a plurality of long pinion gears 88b meshed with the sun gear 86b and the plurality of short pinion gears 88a and meshed with the ring gear 87, and a carrier 89 that couples the plurality of short pinion gears 88a and the plurality of long pinion gears 88b to each other and that rotatably and revolvably holds the gears 88a and the gears 88b. The sun gear 86a is connected to the carrier 84 of the single-pinion type planetary gear mechanism via the clutch C1. The sun gear 86b is connected to the carrier 84 via the clutch C3, and connected to the case via the brake B1. The ring gear 87 is connected to the output shaft 6. The carrier 89 is connected to the input shaft 5 via the clutch C2. The carrier 89 is also connected to the case via the one-way clutch F1, and connected to the case via the B2 which is provided in parallel with the one-way clutch F1.

As illustrated in FIG. 2, the speed change mechanism 80 can switchably establish first to sixth forward speeds, a reverse speed, and a neutral state by engaging and disengaging the clutches C1 to C3 and engaging and disengaging the brakes B1 and B2 in combination. The reverse speed can be established by engaging the clutch C3 and the brake B2 and disengaging the clutches C1 and C2 and the brake B1. The first forward speed can be established by engaging the clutch C1 and disengaging the clutches C2 and C3 and the brakes B1 and B2. When the engine brake is in operation, the first forward speed can be established with the brake B2 engaged. The second forward speed can be established by engaging the clutch C1 and the brake B1 and disengaging the clutches C2 and C3 and the brake B2. The third forward speed can be established by engaging the clutches C1 and C3 and disengaging the clutch C2 and the brakes B1 and B2. The fourth forward speed can be established by engaging the clutches C1 and C2 and disengaging the clutch C3 and the brakes B1 and B2. The fifth forward speed can be established by engaging the clutches C2 and C3 and disengaging the clutch C1 and the brakes B1 and B2. The sixth forward speed can be established by engaging the clutch C2 and the brake B1 and disengaging the clutches C1 and C3 and the brake B2. The neutral state can be established by disengaging all the clutches C1 to C3 and the brakes B1 and B2.

The torque converter 10 is structured as a hydraulic torque converter with a lock-up clutch. As illustrated in FIG. 3, the torque converter 10 includes: the pump impeller 12 connected to the crankshaft 3 of the engine 2 via a converter cover 11; the turbine runner 13 connected to the input shaft 5 of the automatic transmission 4 and disposed to face the pump impeller 12; a stator 14 disposed between the pump impeller 12 and the turbine runner 13 to adjust the flow of hydraulic oil from the turbine runner 13 to the pump impeller 12; a one-way clutch 15 that restricts rotation of the stator 14 to one direction; and the lock-up clutch 20 which mechanically couples the pump impeller 12 (converter cover 11) and the turbine runner 13 to each other. The torque converter 10 transfers torque by converting engine torque into a flow of hydraulic oil through the pump impeller 12, and converting the flow of hydraulic oil into torque on the input shaft 5 of the automatic transmission 4 through the turbine runner 13, In this event, the torque converter 10 functions as a torque amplifier through the action of the stator 14 when the difference between the respective rotational speeds of the pump impeller 12 and the turbine runner 13 is large, and simply functions as a fluid coupling when the difference between the respective rotational speeds of the pump impeller 12 and the turbine runner 13 is small. A converter oil chamber 16 is surrounded by the converter cover 11 and the pump impeller 12 of the torque converter 10. In order to cause hydraulic oil to circulate inside the converter oil chamber 16, the converter oil chamber 16 is formed with a circulation input port 18a for introduction of hydraulic oil, and a circulation output port 18b for discharge of hydraulic oil.

As illustrated in FIG. 3, the lock-up clutch 20 is structured as a multi-plate clutch capable of establishing and releasing lock-up in which the pump impeller 12 and the turbine runner 13 are coupled to each other, and includes: a clutch plate 22 slidably supported by a clutch hub fixed to the converter cover 11; clutch plates 21 and 23 slidably supported by a clutch hub connected to the turbine runner 13; and a clutch piston 24 disposed to be movable within the converter cover 11 so as to press the clutch plates 21 to 23. A lock-up oil chamber 25 is defined on the back surface side of the clutch piston 24. A pressure difference between the hydraulic pressure of hydraulic oil introduced into the lock-up oil chamber 25 and the hydraulic pressure of hydraulic oil inside the converter oil chamber 16 moves the clutch piston 24 to apply a compression pressure to the clutch plates 21 to 23 to establish lock-up in which the pump impeller 12 and the turbine runner 13 are coupled to each other. The lock-up oil chamber 25 is formed with a lock-up port 18c for introduction and discharge of hydraulic oil.

As illustrated in FIG. 3, the hydraulic control device 30 according to the embodiment includes: a mechanical oil pump 31 that pumps hydraulic oil from an oil pan 32 to a line pressure oil passage L1 via a strainer 32a using power from the engine; a primary regulator valve 34 that regulates the pressure of hydraulic oil pumped to the line pressure oil passage L1 to generate a line pressure PL and that outputs hydraulic oil to a secondary pressure oil passage L2 along with the generation of the line pressure PL; a secondary regulator valve 36 that regulates the pressure of hydraulic oil in the secondary pressure oil passage L2 to generate a secondary pressure Psec; a linear solenoid SLT that regulates a modulator pressure Pmod from a modulator valve (not illustrated) to generate a signal pressure Pslt for driving the primary regulator valve 34 and the secondary regulator valve 36; a lock-up control valve 40 that generates a control pressure Pcl for engaging the lock-up clutch 20 from the line pressure PL in the line pressure oil passage L1 to output the generated pressure; a lock-up relay valve 50 that switches between paths through which hydraulic oil is supplied to and discharged from the torque converter 10; and a linear solenoid SLU that regulates the modulator pressure Pmod to generate a signal pressure Pslu for driving the lock-up control valve 40 and the lock-up relay valve 50. Although not illustrated, the line pressure PL is also used to control the engagement pressures for the clutches C1 to C3 and the brakes B1 and B2 provided in the automatic transmission 4 or the like. The linear solenoid SLT and the linear solenoid SLU are controlled by the ATECU 91. The ATECU 91 is structured as a microprocessor including a CPU as its main component, and includes a ROM that stores a processing program, a RAM that temporarily stores data, input and output ports, a communication port, and so forth in addition to the CPU. The ATECU 91 communicates with the main ECU 92 to exchange control signals and data with the main ECU 92.

The lock-up control valve 40 is a pressure regulation valve actuated by the signal pressure Pslu from the linear solenoid SLU. As illustrated in FIG. 3, the lock-up control valve 40 includes a sleeve 42 formed with various ports, a spool 44 that allows and blocks communication between associated ports, and a spring 46 that urges the spool 44 upward in the drawing. The various ports formed in the sleeve 42 include: a signal pressure input port 42a that receives the signal pressure Pslu from the linear solenoid SLU; an input port 42b connected to the line pressure oil passage L1 to receive the line pressure PL; an output port 42c that outputs a hydraulic pressure obtained by regulating the line pressure PL; a feedback port 42d that receives the pressure output from the output port 42c as a feedback pressure that urges the spool 44 downward in the drawing; communication ports 42e and 42f connected to both ends of a communication oil passage L3; and a drain port 42g that discharges hydraulic oil. The signal pressure input port 42a is formed at a position between two lands formed on the spool 44 with different outside diameters. Therefore, the signal pressure input to the signal pressure input port 42a acts as a force that urges the spool 44 upward in the drawing because of the difference in area (difference in outside diameter) between respective pressure receiving surfaces of the two lands, namely a land with a larger diameter on the upper side in the drawing and a land with a smaller diameter on the lower side in the drawing. Thus, the spool 44 is urged upward in the drawing by the spring force of the spring 46 and the signal pressure Pslu input to the signal pressure input port 42a, and urged downward in the drawing by the feedback pressure input to the feedback port 42d.

In the lock-up control valve 40, the control pressure Pcl is regulated so as to become higher as the spool 44 is moved upward in the drawing by increasing the area of communication between the input port 42b and the output port 42c and reducing the area of communication between the output port 42c and the communication port 42e or blocking communication between the output port 42c and the communication port 42e. The communication port 42e communicates with the drain port 42g via the communication oil passage L3 and the communication port 42f. When communication between the output port 42c and the communication port 42e is allowed, hydraulic oil in the output port 42c is drained from the drain port 42g via the communication oil passage L3. When the spool 44 is moved downward in the drawing to the lower end, communication between the communication port 42f and the drain port 42g is blocked, and drainage of hydraulic oil in the output port 42c is stopped. The lock-up control valve 40 is normally controlled with the spool 44 located at a position above the lower end. In the case where the spool 44 is stuck at the lower end for some reason, however, the control pressure Pcl in the output port 42c is not drained from the drain port 42g to prevent release of the control pressure Pcl.

The lock-up relay valve 50 is a switching valve actuated by the signal pressure Pslu from the linear solenoid SLU to switch between paths for a hydraulic pressure. As illustrated in FIG. 3, the lock-up relay valve 50 includes a sleeve 52 formed with various ports, a spool 54 that allows and blocks communication between associated ports, and a spring 56 that urges the spool 54 upward in the drawing. The various ports formed in the sleeve 52 include: a signal pressure input port 52a that receives the signal pressure Pslu from the linear solenoid SLU; an input port 52b connected to the output port 42c of the lock-up control valve 40 via a control pressure oil passage L4 to receive the control pressure Pcl from the output port 42c; an input port 52c connected to the output port 42c of the lock-up control valve 40 via a control pressure oil passage L5 to receive the control pressure Pcl from the output port 42c; an input port 52d connected to the secondary pressure oil passage L2 to receive the secondary pressure Psec; an output port 52e connected to the circulation input port 18a of the torque converter 10 via a circulation input oil passage L6; an output port 52f connected to the lock-up port 18c of the torque converter 10 via a lock-up oil passage L7; an input port 52g connected to the circulation output port 18b of the torque converter 10 via a circulation output oil passage L8; a relief port 52h connected to a relief oil passage L9 provided with a relief valve 62; a relief port 52i connected to a relief oil passage L10 provided with a relief valve 64; and a relief port 52j also connected to the relief oil passage L10. A cooler (COOLER) 66 is connected posterior to the relief valve 64. Hydraulic oil output to the relief oil passage L10 is cooled by the cooler 66 via the relief valve 64. Here, the relief valve 64 is a valve that opens when a hydraulic pressure that is equal to or more than a set pressure is applied. The spool 54 is urged upward in the drawing by the spring force of the spring 56, and urged downward in the drawing by the signal pressure Pslu input to the signal pressure input port 52a.

An orifice 70 that is a throttle that restricts the flow rate of hydraulic oil to reduce a supplied pressure is formed in the control pressure oil passage L5. The control pressure Pcl from the output port 42c of the lock-up control valve 40 is reduced by the orifice 70, and input to the input port 52c of the lock-up relay valve 50. A bypass oil passage L11 that bypasses the orifice 70 is connected to the control pressure oil passage L5. The bypass oil passage L11 is provided with a check valve 68 that opens only in such a direction that hydraulic oil flows from the input port 52c of the lock-up relay valve 50 toward the output port 42c of the lock-up control valve 40.

In the lock-up relay valve 50, as illustrated in FIG. 4, when the signal pressure Pslu is not input from the linear solenoid SLU to the signal pressure input port 52a, the spool 54 is moved upward in the drawing by the urging force of the spring 56. Therefore, communication between the input port 52b and the output port 52f is blocked, communication between the input port 52c and the output port 52e is blocked, communication between the input port 52d and the output port 52e is allowed, communication between the output port 52f and the relief port 52i is allowed, communication between the input port 52g and the relief port 52h is blocked, and communication between the input port 52g and the relief port 52j is allowed. This allows communication between the secondary pressure oil passage L2 to which the input port 52d is connected and the circulation input oil passage L6 to which the output port 52e is connected, and communication between the circulation output oil passage L8 to which the input port 52g is connected and the relief oil passage L10 to which the relief port 52j is connected. Thus, the secondary pressure Psec is fed from the input port 52d of the lock-up relay valve 50 to the cooler 66 as a circulation pressure, sequentially via the output port 52e, the circulation input oil passage L6, the circulation input port 18a, the converter oil chamber 16, the circulation output port 18b, the circulation output oil passage L8, the input port 52g, the relief port 52j, the relief oil passage L10, and the relief valve 64. In addition, the hydraulic pressure in the lock-up oil chamber 25 is fed from the lock-up port 18c to the cooler 66, sequentially via the lock-up oil passage L7, the output port 52f and the relief port 52i of the lock-up relay valve 50, the relief oil passage L10, and the relief valve 64. When the signal pressure Pslu is input from the linear solenoid SLU to the signal pressure input port 52a as shown in FIG. 5, on the other hand, the spool 54 is moved downward in the drawing with a pressing force that overcomes the urging force of the spring 56 applied to the spool 54. Therefore, communication between the input port 52b and the output port 52f is allowed, communication between the input port 52c and the output port 52e is allowed, communication between the input port 52d and the output port 52e is blocked, communication between the output port 52f and the relief port 52i is blocked, communication between the input port 52g and the relief port 52h is allowed, and communication between the input port 52g and the relief port 52j is blocked. This allows communication between the control pressure oil passage L4 to which the input port 52b is connected and the lock-up oil passage L7 to which the output port 52f is connected, communication between the control pressure oil passage L5 to which the input port 52c is connected and the circulation input oil passage L6 to which the output port 52e is connected, and communication between the circulation output oil passage L8 to which the input port 52g is connected and the relief oil passage L9 to which the relief port 52h is connected. Thus, the control pressure Pcl output from the output port 42c of the lock-up control valve 40 is supplied from the input port 52b of the lock-up relay valve 50 to the lock-up oil chamber 25 as an engagement pressure for engaging the lock-up clutch 20 via the output port 52f, the lock-up oil passage L7, and the lock-up port 18c. In addition, a hydraulic pressure output from the output port 42c of the lock-up control valve 40 and reduced by the orifice 70 is drained from the input port 52c of the lock-up relay valve 50 as the circulation pressure, sequentially via the output port 52e, the circulation input oil passage L6, the circulation input port 18a, the converter oil chamber 16, the circulation output port 18b, the circulation output oil passage L8, the input port 52g, the relief port 52h, the relief oil passage L9, and the relief valve 62.

Now, operation of the hydraulic control device 30 according to the embodiment structured as described above will be described. First, operation to disengage the lock-up clutch 20 will be described. The lock-up clutch 20 is disengaged by turning off the linear solenoid SLU to bring the lock-up relay valve 50 into the state of FIG. 4. In this state, as discussed earlier, communication between the secondary pressure oil passage L2 and the circulation input oil passage L6 is allowed, the circulation output oil passage L8 is communicated with the relief oil passage L10, and the lock-up oil passage L7 is communicated with the relief oil passage L10. Therefore, the secondary pressure Psec is introduced from the circulation input port 18a into the converter oil chamber 16 of the torque converter 10 via the circulation input oil passage L6, and the secondary pressure Psec introduced into the converter oil chamber 16 is supplied from the circulation output port 18b to the cooler 66 via the circulation output oil passage L8, the relief oil passage L10, and the relief valve 64, and returned to the oil pan 32. That is, the secondary pressure Psec is supplied to the converter oil chamber 16 as the circulation pressure. In the lock-up oil chamber 25, in addition, communication between the control pressure oil passage L4 and the lock-up oil passage L7 is blocked, and communication between the lock-up oil passage L7 and the relief oil passage L10 is allowed. Therefore, a hydraulic pressure applied to the lock-up oil chamber 25 is supplied to the cooler 66 via the lock-up oil passage L7, the relief oil passage L10, and the relief valve 64, and returned to the oil pan 32. At this time, the circulation pressure is fed to the relief oil passage L10, and the relief valve 64 keeps the hydraulic pressure within the relief oil passage L10 at a set pressure, which allows the lock-up oil chamber 25 and the lock-up oil passage L7 to be filled with hydraulic oil.

Next, operation to engage the lock-up clutch 20 will be described. The lock-up clutch 20 is engaged by turning on the linear solenoid SLU to bring the lock-up relay valve 50 into the state of FIG. 5, and adjusting the signal pressure Pslu output from the linear solenoid SLU such that a pressure difference between the hydraulic pressure in the lock-up oil chamber 25 and the hydraulic pressure in the converter oil chamber 16 is at a target hydraulic pressure to control the lock-up control valve 40. In this state, as discussed earlier, communication between the control pressure oil passage L4 and the lock-up oil passage L7 is allowed, communication between the control pressure oil passage L5 and the circulation input oil passage L6 is allowed, and communication between the circulation output oil passage L8 and the relief oil passage L9 is allowed. Therefore, the control pressure Pcl from the lock-up control valve 40 is introduced from the lock-up port 18c into the lock-up oil chamber 25 via the lock-up oil passage L7. At this time, as discussed earlier, the lock-up oil chamber 25 and the lock-up oil passage L7 are filled with hydraulic oil even when the lock-up clutch 20 is disengaged, and thus the hydraulic pressure in the lock-up oil chamber 25 is immediately raised by introduction of the control pressure Pcl. In addition, the control pressure Pcl is reduced by the orifice 70, and introduced from the circulation input port 18a into the converter oil chamber 16 of the torque converter 10 via the circulation input oil passage L6, and the hydraulic pressure introduced into the converter oil chamber 16 is drained from the circulation output port 18b via the circulation output oil passage L8, the relief oil passage L9, and the relief valve 62, and returned to the oil pan 32. That is, the control pressure Pcl is applied to the lock-up oil chamber 25, and a hydraulic pressure obtained by reducing the control pressure Pcl by the orifice 70 is applied to the converter oil chamber 16. Thus, a pressure difference is caused between the hydraulic pressures in the lock-up oil chamber 25 and the converter oil chamber 16 to engage the lock-up clutch 20. The pressure difference is larger as the control pressure Pcl is higher, and is smaller as the control pressure Pcl is lower. Thus, the engagement pressure for the lock-up clutch 20 can be controlled by regulating the control pressure Pcl by the lock-up control valve 40. At this time, the line pressure PL is used as the source pressure for the hydraulic pressures to be applied to the lock-up oil chamber 25 and the converter oil chamber 16, and thus the lock-up clutch 20 can be engaged from a state in which the engine 2 is at a relatively low rotational speed compared to a case where the secondary pressure Psec is used as the source pressure. In addition, the hydraulic pressures to be applied to the lock-up oil chamber 25 and the converter oil chamber 16 are based on the same source pressure, and thus a stable pressure difference can be caused, which improves the controllability of the lock-up clutch 20.

Here, a case where slip control in which the lock-up clutch 20 is subjected to slip engagement is performed is considered. In the slip control, the engagement pressure for the lock-up clutch 20 is controlled by increasing and reducing the hydraulic pressure in the lock-up oil chamber 25 and the hydraulic pressure in the converter oil chamber 16 such that the rotational speed difference between the rotational speed of the crankshaft 3 of the engine 2 (pump impeller 12) and the input shaft 5 of the automatic transmission 4 (turbine runner 13) is at a target rotational speed difference. A portion of the lock-up oil chamber 25 on the lock-up port 18c side is connected to the drain port 42g of the lock-up control valve 40 via the lock-up oil passage L7, the control pressure oil passage L4, and the communication oil passage L3. Therefore, the hydraulic pressure in the lock-up oil chamber 25 is reduced by moving the spool 44 using the signal pressure Pslu from the linear solenoid SLU to drain an extra portion of the control pressure Pcl from the drain port 42g of the lock-up control valve 40. On the other hand, a portion of the converter oil chamber 16 on the circulation output port 18b side is connected to the relief valve 62 which drains hydraulic oil via the circulation output oil passage L8 and the relief oil passage L9, and a portion of the converter oil chamber 16 on the circulation input port 18a side is connected to the drain port 42g of the lock-up control valve 40 via the circulation input oil passage L6, the bypass oil passage L11 (check valve 68), and the communication oil passage L3. Therefore, the hydraulic pressure in the converter oil chamber 16 is reduced by draining the hydraulic pressure from the circulation output port 18b side through the relief valve 62 via the circulation output oil passage L8 and the relief oil passage L9, and draining the hydraulic pressure from the circulation input port 18a side through the drain port 42g of the lock-up control valve 40 via the circulation input oil passage L6, the control pressure oil passage L4, and the communication oil passage L3. That is, the hydraulic pressure in the converter oil chamber 16 can be drained from both the circulation output port 18b side and the circulation input port 18a side. In this way, the hydraulic pressure in the converter oil chamber 16 can be reduced quickly, which improves the controllability in establishing slip engagement of the lock-up clutch 20.

The hydraulic control device 30 according to the embodiment described above includes the lock-up control valve 40 which regulates the source pressure to generate the control pressure Pcl, and the lock-up relay valve 50 which switches between paths through which a hydraulic pressure is supplied to and discharged from the torque converter 10. The lock-up relay valve 50 is formed to be capable of switching between a path that connects between the control pressure oil passage L4 to which the control pressure Pcl is output and the lock-up oil passage L7 communicated with the lock-up oil chamber 25 and that connects between the control pressure oil passage L5 to which the control pressure Pcl is output and the circulation input oil passage L6 communicated with the converter oil chamber 16, and a path that blocks connection between the control pressure oil passage L4 and the lock-up oil passage L7 and that blocks connection between the control pressure oil passage L5 and the circulation input oil passage L6. The control pressure oil passage L5 is formed with the orifice 70 for reducing the control pressure Pcl. This allows the lock-up clutch 20 to be engaged by generating a stable pressure difference between the lock-up oil chamber 25 and the converter oil chamber 16. Moreover, the line pressure PL is used as the source pressure for the hydraulic pressures to be supplied to the lock-up oil chamber 25 and the converter oil chamber 16 when the lock-up clutch 20 is to be engaged, and the secondary pressure Psec is used as the source pressure for the circulation pressure to be supplied to the converter oil chamber 16 when the lock-up clutch 20 is to be disengaged. Thus, the lock-up clutch 20 can be engaged from a state in which the engine 2 is at a relatively low rotational speed, and a reduction in line pressure PL can be suppressed in disengaging the lock-up clutch 20, which suppresses an increase in size of the mechanical oil pump 31. In addition, the control pressure oil passage L5 is provided with the bypass oil passage L11 which bypasses the orifice 70, and the bypass oil passage L11 is provided with the check valve 68. Thus, the hydraulic pressure in the converter oil chamber 16 can be reduced quickly by draining hydraulic oil from both the circulation output port 18b side and the circulation input port 18a side, which improves the controllability in establishing slip engagement of the lock-up clutch 20.

In the embodiment, both the lock-up control valve 40 and the lock-up relay valve 50 are controlled using the signal pressure Pslu from the single linear solenoid SLU. However, the present invention is not limited thereto, and the lock-up control valve 40 and the lock-up relay valve 50 may be controlled separately using signal pressures from separate linear solenoids.

In the embodiment, the control pressure oil passage L5 is provided with the bypass oil passage L11 which bypasses the orifice 70, and the bypass oil passage L11 is provided with the check valve 68. However, the bypass oil passage L11 and the check valve 68 may be dispensed with. In this case also, the hydraulic pressure in the converter oil chamber 16 can be drained from the circulation output port 18b side, and can be drained from the circulation input port 18a side via the orifice 70.

In the embodiment, the relief oil passage L10 is provided with the relief valve 64. However, the present invention is not limited thereto, and the relief valve 64 may be dispensed with.

In the embodiment, the output port 42c of the lock-up control valve 40 which outputs the control pressure Pcl is communicated with the drain port 42g via the communication port 42e, the communication oil passage L3, and the communication port 42f. However, the output port 42c may be communicated with the drain port 42g directly. In this case, it is desirable that a relief valve should be provided posterior to the drain port 42g.

In the embodiment, switching between paths through which a hydraulic pressure is supplied to and discharged from the circulation input oil passage L6, the circulation output oil passage L8, and the lock-up oil passage L7 for the torque converter 10 is performed using the single lock-up relay valve 50. However, such switching may be performed using a plurality of relay valves.

Here, the correspondence between the main elements of the embodiment and the main elements of the invention described in the "SUMMARY OF THE INVENTION" section will be described. In the embodiment, the circulation input port 18a corresponds to the "circulation input port". The circulation output port 18b corresponds to the "circulation output port". The circulation input oil passage L6 corresponds to the "circulation input oil passage". The circulation output oil passage L8 corresponds to the "circulation output oil passage". The lock-up oil passage L7 corresponds to the "engagement oil passage". The lock-up control valve 40 corresponds to the "pressure regulation valve". The lock-up relay valve 50 corresponds to the "switcher". The orifice 70 corresponds to the "orifice". In addition, the mechanical oil pump 31 corresponds to the "pump". The primary regulator valve 34 and the secondary regulator valve 36 correspond to the "hydraulic pressure generator". The line pressure oil passage L1 corresponds to the "line pressure oil passage". The secondary pressure oil passage L2 corresponds to the "secondary pressure oil passage". Further, the bypass oil passage L11 corresponds to the "bypass oil passage". The check valve 68 corresponds to the "one-way valve". Moreover, the relief oil passage L10 corresponds to the "relief oil passage". The relief valve 64 corresponds to the "relief valve". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. For example, the "switcher" may include the linear solenoid SLT. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

INDUSTRIAL APPLICABILITY

The present invention can be utilized in the industry for the manufacture of hydraulic control devices.

The invention claimed is:

1. A hydraulic control device that controls a hydraulic pressure for a torque converter with a lock-up clutch having a circulation oil chamber for circulation of hydraulic oil within a converter body and an engagement oil chamber for engagement of the lock-up clutch using a pressure difference between a supplied hydraulic pressure and the hydraulic pressure within the circulation oil chamber, comprising:
   a circulation input oil passage connected to a circulation input port through which a circulation pressure is input to the circulation oil chamber;
   a circulation output oil passage connected to a circulation output port through which the circulation pressure is output from the circulation oil chamber;
   an engagement oil passage connected to an engagement port through which an engagement pressure is input to and output from the engagement oil chamber;
   a pressure regulation valve that receives and regulates a source pressure to output a regulated pressure;
   a first output oil passage connected to an output port of the pressure regulation valve;
   a second output oil passage connected to the output port of the pressure regulation valve;
   a switcher that switches between a first state in which connection between the engagement oil passage and the first output oil passage is allowed and connection between the circulation input oil passage and the second output oil passage is allowed, and a second state in which connection between the engagement oil passage and the first output oil passage is blocked and connection between the circulation input oil passage and the second output oil passage is blocked;
   an orifice formed in the second output oil passage;
   a pump that generates a generated pressure using power of an engine;
   a hydraulic pressure generator that generates a line pressure that is high and a secondary pressure that is lower than the line pressure on the basis of the generated pressure generated by the pump;
   a line pressure oil passage supplied with the line pressure; and
   a secondary pressure oil passage supplied with the secondary pressure, wherein:
   an input port of the pressure regulation valve is connected to the line pressure oil passage; and
   the switcher further blocks connection between the secondary pressure oil passage and the circulation input oil passage in the first state, and further allows connection between the secondary pressure oil passage and the circulation input oil passage in the second state.

2. The hydraulic control device according to claim 1, further comprising:
   a bypass oil passage connected to the first output oil passage so as to bypass the orifice; and
   a one-way valve that is attached to the bypass oil passage and that opens only in such a direction that the circulation pressure is discharged from the circulation input port.

3. The hydraulic control device according to claim 1, further comprising:
   a relief oil passage provided with a relief valve that opens when a relief oil pressure, that is a pressure in the relief oil passage, equal to or more than a set pressure is applied, wherein
   the switcher further blocks connection between the engagement oil passage and the relief oil passage in the first state, and further allows connection between the engagement oil passage and the relief oil passage and connection between the circulation output oil passage and the relief oil passage in the second state.

* * * * *